US008245958B2

(12) United States Patent
Ko

(10) Patent No.: US 8,245,958 B2
(45) Date of Patent: Aug. 21, 2012

(54) POWDER SPRAYER

(76) Inventor: Chuan-Wei Ko, Chung-Li (TW)

( * ) Notice: Subject to any disclaimer, the term of this patent is extended or adjusted under 35 U.S.C. 154(b) by 308 days.

(21) Appl. No.: 12/652,008

(22) Filed: Jan. 4, 2010

(65) Prior Publication Data

US 2011/0163183 A1 Jul. 7, 2011

(51) Int. Cl.
*A01C 3/06* (2006.01)

(52) U.S. Cl. ......... 239/650; 239/654; 222/632; 222/633

(58) Field of Classification Search .................. 239/325, 239/327, 340, 373, 650, 654; 222/632, 633
See application file for complete search history.

(56) References Cited

U.S. PATENT DOCUMENTS 2,014,671 A * 9/1935 Rothe ........................... 222/373
2,126,924 A * 8/1938 Rose ............................. 239/654
2,551,676 A * 5/1951 Hoffman ....................... 222/633
4,730,751 A * 3/1988 Mackles et al. ............... 239/327
7,455,248 B2 * 11/2008 Kablik et al. ................. 239/654

* cited by examiner

*Primary Examiner* — Steven J Ganey

(57) ABSTRACT

A powder sprayer includes a sprayer body having a nozzle head mounted on the top side of the bottle cap thereof, the nozzle head having a transverse mounting hole disposed in communication with a vertical through hole of the bottle cap and a guide notch located on the periphery at one end of the transverse mounting hole, and a spraying mechanism having a nozzle tube positioned in the transverse mounting hole, the nozzle tube having a guide block protruded from the periphery thereof and fitting the guide notch of the nozzle head, an axial air passage and a transverse suction hole disposed in communication between the air passage and the through hole of the bottle cap for sucking powder from the powder bottle through a dip tube into the air passage upon passing of a flow of forced air through the air passage.

5 Claims, 5 Drawing Sheets

POWDER SPRAYER

BACKGROUND OF THE INVENTION

1. Field of the Invention

The present invention relates to sprayers and more particularly, to a powder sprayer, which has a simple structural design.

2. Description of the Related Art

Perfume powder for hair, face or body application may be contained in a bottle or spray bottle. However, when using a bottled perfume powder, it is difficult to control the applied amount of perfume powder. The most commonly used design of perfume powder sprayer comprises a powder bottle, an accumulator fastened to the top side of the powder bottle and holding a dip tube in the powder bottle, a nozzle tube fastened to the accumulator at one side and an inflation bulb connected to the accumulator at the opposite side. When the user compresses the inflation bulb to force the inside air out of the inflation bulb through the accumulator and the nozzle tube, a vacuum suction force is produced in the accumulator subject to a venturi action, causing the dip tube to suck the perfume powder from the powder bottle into the accumulator for carrying by the forced air out of the nozzle tube in a mist for application. This design of perfume powder sprayer has a complicated structure. The installation of this design of perfume powder sprayer requires much labor and time, lowering the yield rate.

SUMMARY OF THE INVENTION

The present invention has been accomplished under the circumstances in view. It is one object of the present invention to provide a powder sprayer, which uses a nozzle head and a nozzle tube for causing a venturi action to suck in a powder from a powder bottle for application. It is another object of the present invention to provide a powder sprayer, which has a simple, facilitating the design of the component parts. It is still another object of the present invention to provide a powder sprayer, which provides a matching arrangement between the nozzle tube and the nozzle head, so that the nozzle tube can be installed in the nozzle head only when it is kept at a specific angle, thereby improving the product yield rate.

To achieve these and other objects of the present invention, a powder spray comprises a sprayer body holding a powder in a powder bottle thereof and a dip tube in said powder bottle, and a spraying mechanism installed in the sprayer body and operable through an inflation bulb thereof to force the powder out of the sprayer body in a mist. The sprayer body comprises a bottle cap fastened to the powder bottle and a nozzle head mounted on the top side of the bottle cap. The bottle cap has a through hole vertically cut through top and bottom sides thereof for guiding in the powder from the powder bottle through the dip tube. The nozzle head has a transverse mounting hole transversely cut through the periphery thereof in communication with the through hole of the bottle cap and a guide notch located on the periphery at one end of the transverse mounting hole. The spraying mechanism comprises a nozzle tube positioned in the transverse mounting hole, the nozzle tube having a guide block protruded from the periphery thereof and fitting the guide notch of the nozzle head, an air passage axially cut through two distal end thereof and connected to the inflation bulb and a transverse suction hole located on the periphery thereof and disposed in communication between the air passage and the through hole of the bottle cap for sucking the powder from the powder bottle through the dip tube into the air passage when the inflation bulb is compressed by a user to force air out of the inflation bulb through the air passage.

DETAILED DESCRIPTION OF THE PREFERRED EMBODIMENT

Figure 1:
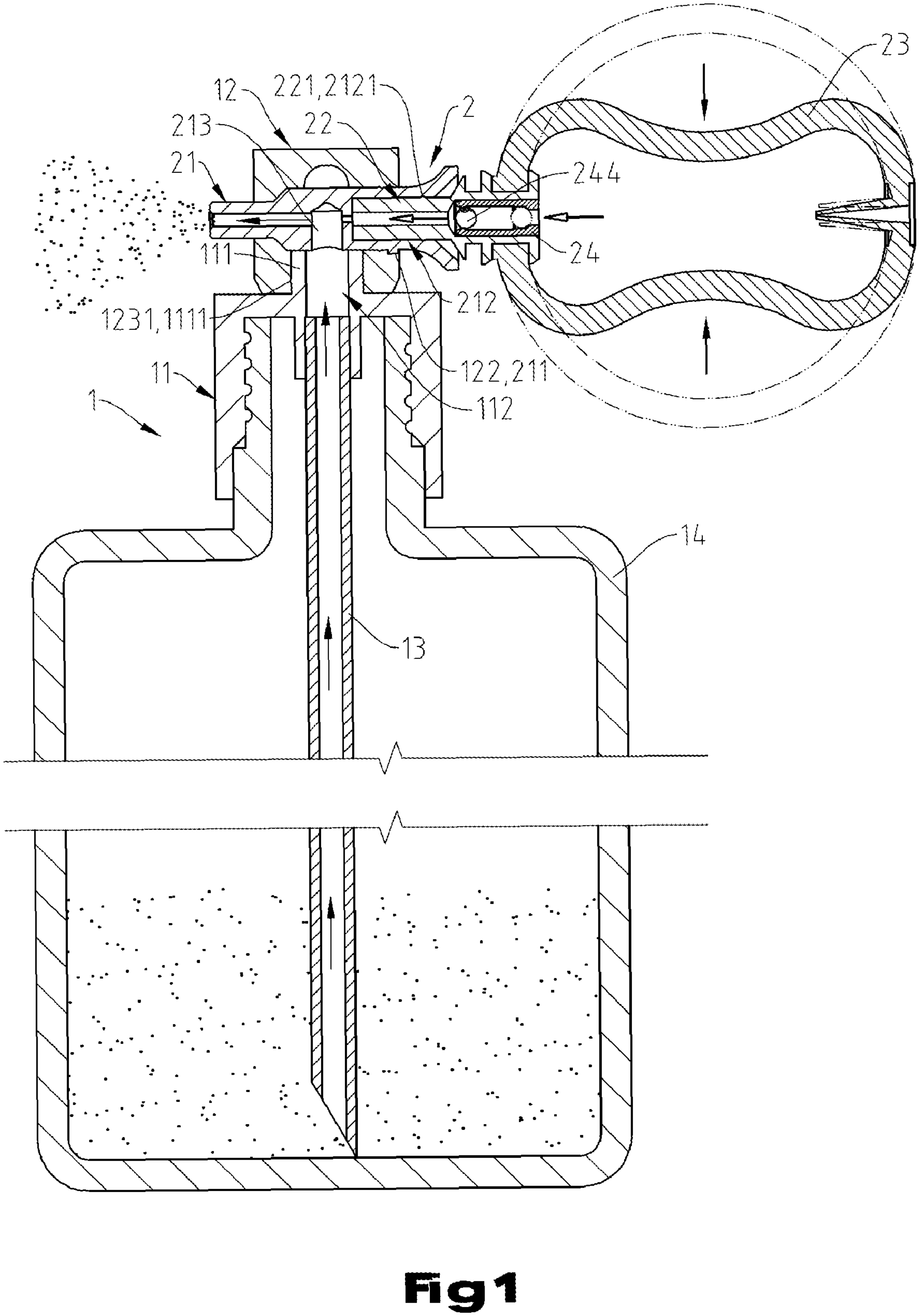
FIG. 1 is a schematic sectional side view, showing an operation status of a powder sprayer in accordance with the present invention.
Figure 2:
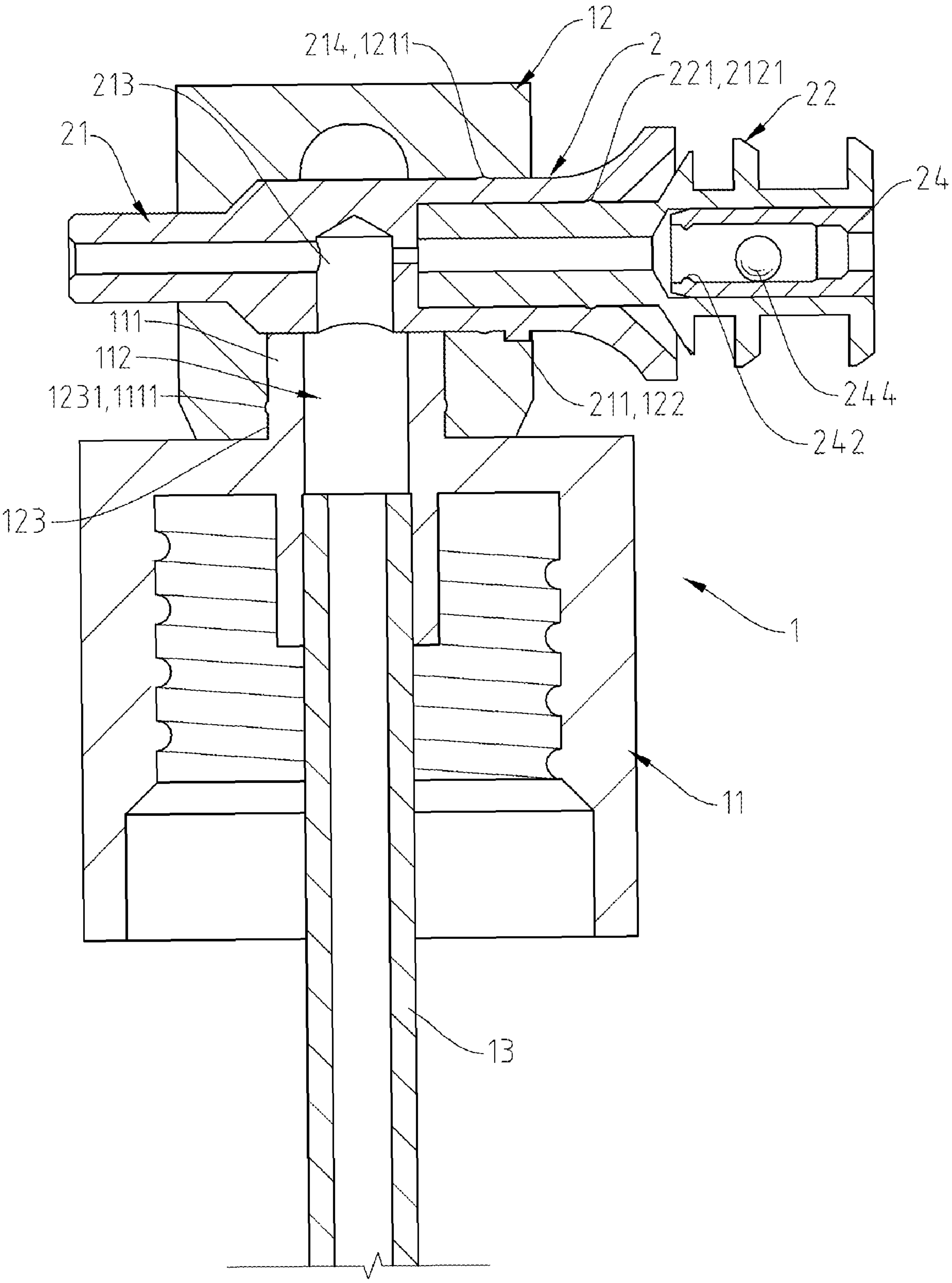
FIG. 2 is a sectional side view of a part of the powder sprayer in accordance with the present invention.
Figure 3:
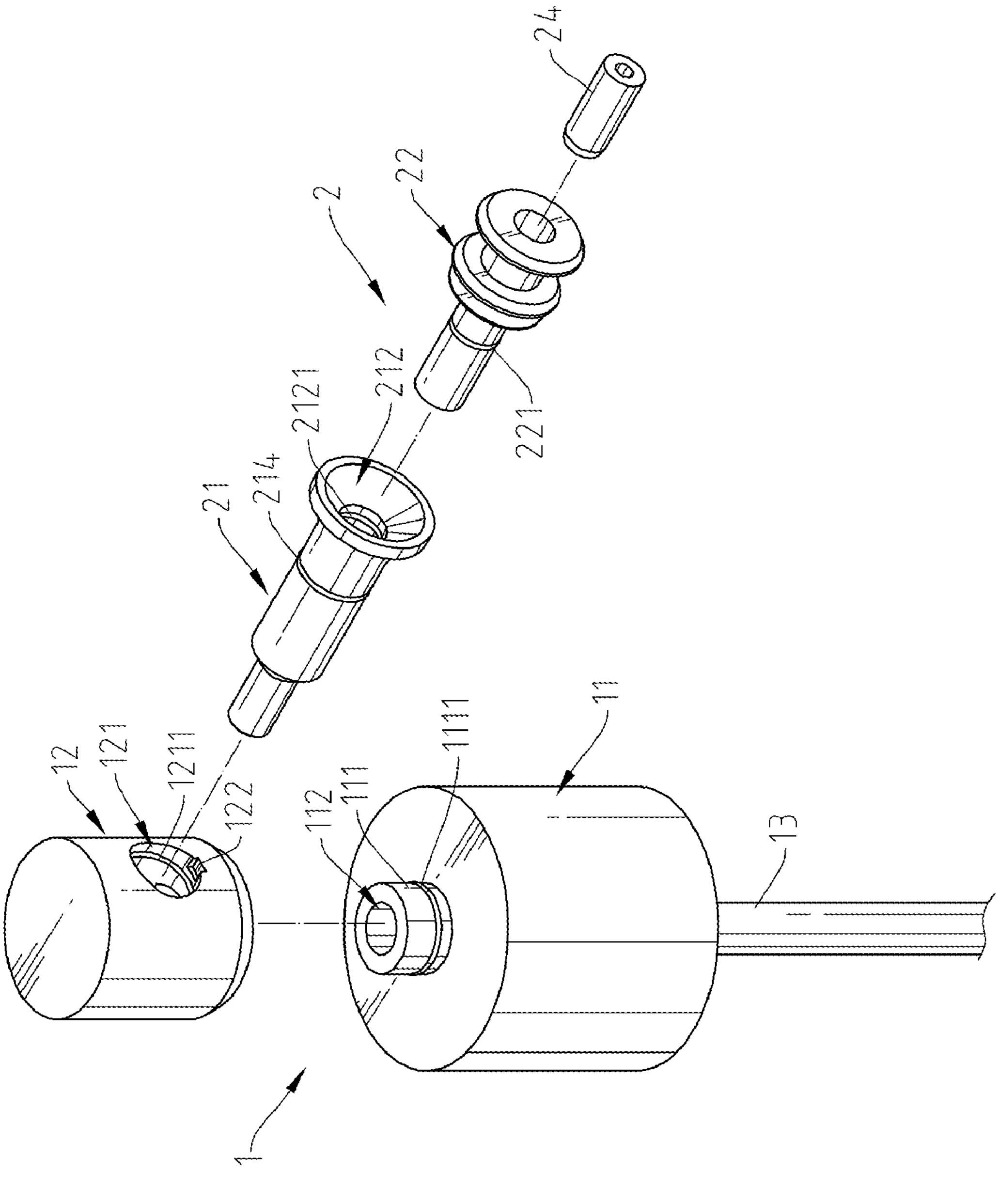
FIG. 3 is an exploded view of a part of the powder sprayer in accordance with the present invention.
Figure 4:
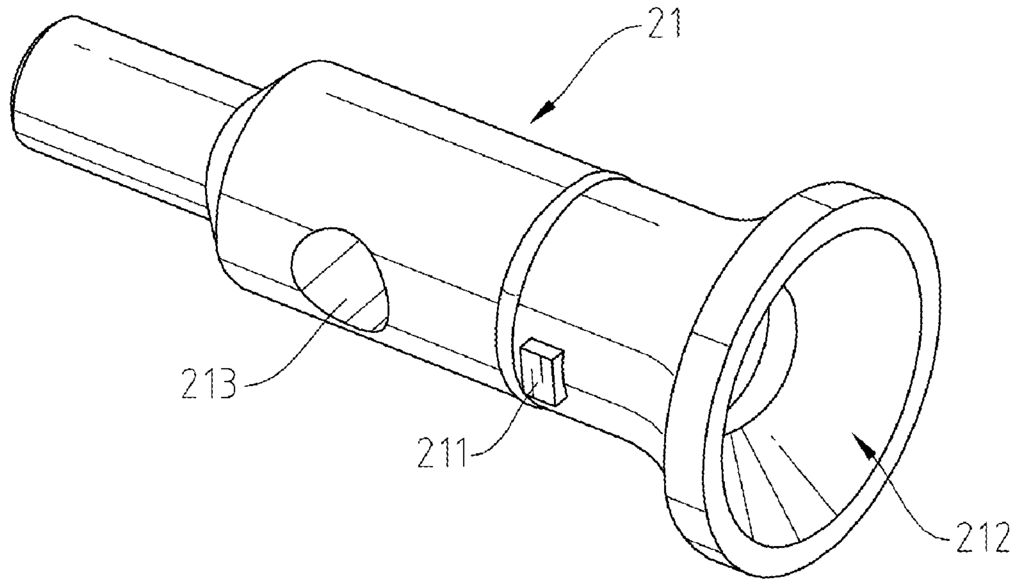
FIG. 4 is an oblique elevation of the nozzle tube of the powder sprayer in accordance with the present invention.
Figure 5:
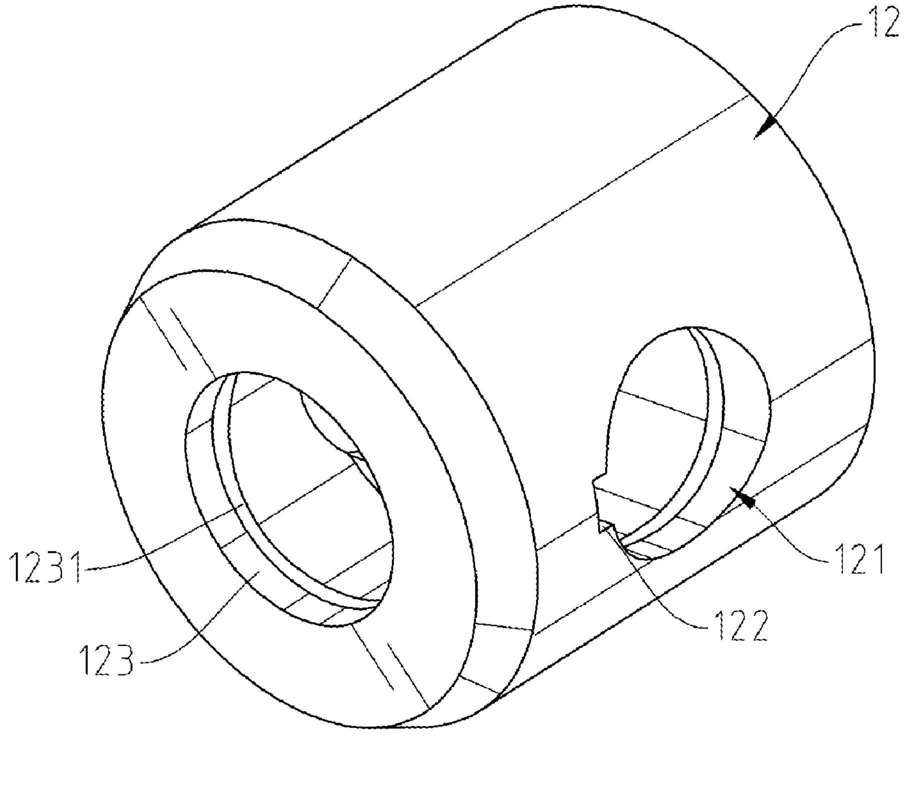
FIG. 5 is an oblique elevation of the nozzle head of the powder sprayer in accordance with the present invention.
Figure 6:
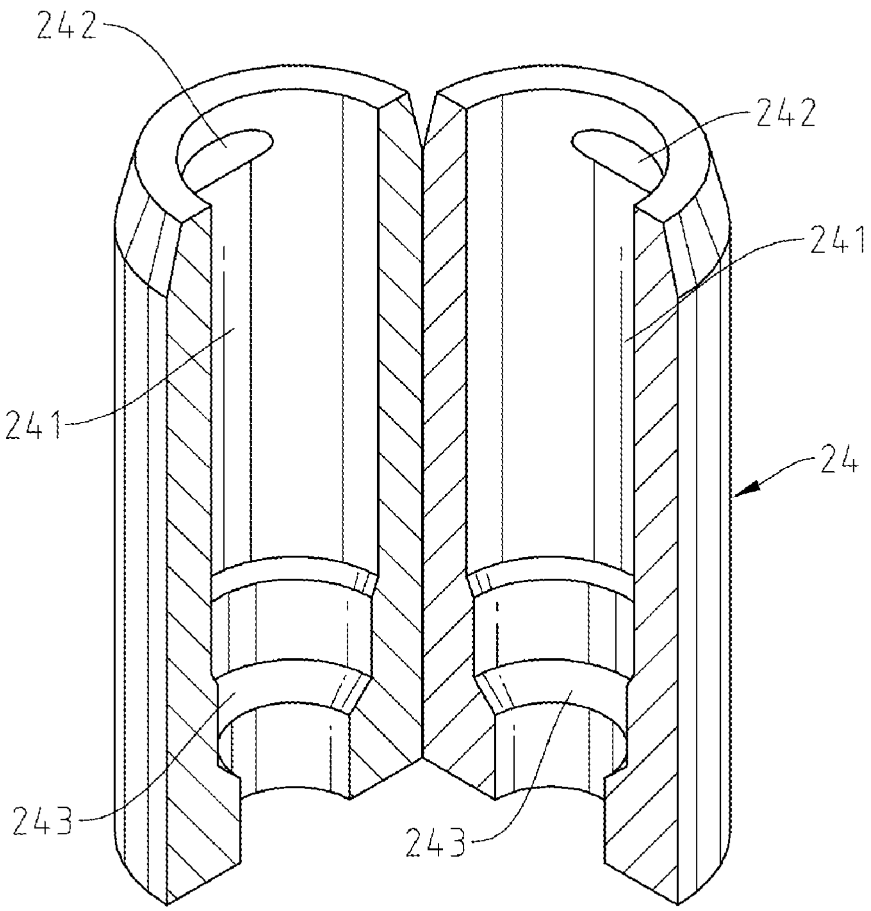
FIG. 6 is a sectional elevation showing the internal structure of the valve tube of the powder sprayer in accordance with the present invention.
Figure 7:
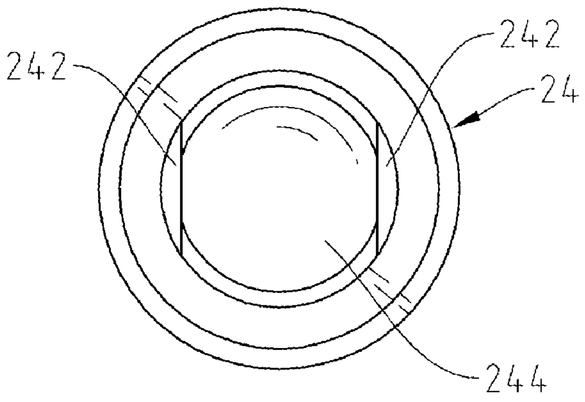
FIG. 7 is a cross sectional view of the valve tube of the powder sprayer in accordance with the present invention.

Referring to FIGS. 1-7, a powder sprayer in accordance with the present invention is shown comprising a sprayer body 1 and a spraying mechanism 2. The sprayer body 1 comprises a bottle cap 11, a nozzle head 12, a dip tube 13 and a powder bottle 14. The spraying mechanism 2 comprises a nozzle tube 21, a connection tube 22, an inflation bulb 23 and a valve tube 24.

The bottle cap 11 has a top neck 111, a first endless rib 1111 protruded from and extending around the periphery of the top neck 111 and a through hole 112 axially extending through the top neck 111.

The nozzle head 12 has a transverse mounting hole 121 transversely cut through the periphery thereof, a guide notch 122 located on the periphery at one end of the mounting hole 121, a bottom hole 123 located on the bottom side thereof, a first inside annular groove 1231 disposed inside the bottom hole 123 and a second inside annular groove 1211 disposed in one end of the mounting hole 121.

The nozzle tube 21 has a guide block 211 protruded from the periphery, a second endless rib 214 protruded from and extending around the periphery adjacent to the guide block 211, an air passage 212 axially extending through the two distal ends thereof, a third inside annular groove 2121 disposed in one end of the air passage 212 and a transverse suction hole 213 located on the periphery and perpendicularly disposed in communication with the air passage 212.

The connection tube 22 has a third endless rib 221 protruded from and extending around the periphery thereof.

The valve tube 24 has an axial air hole 241 extending through the two distal ends thereof, a stop flange 242 protruded from the inside wall near one end of the axial air hole 241 and a constricted portion 243 at the other end of the axial air hole 241. Further, the valve tube 24 holds a ball 244 therein. The ball 244 is movably accommodated in the axial air hole 241 between the stop flange 242 and the constricted portion 243.

During installation of the powder sprayer, attach the nozzle head 12 to the bottle cap 11 by coupling the bottom hole 123 of the nozzle head 12 to the top neck 111 of the bottle cap 11 to force the first inside annular groove 1231 into engagement with the first endless rib 1111, and then connect the dip tube 13 to the through hole 112 of the bottle cap 11, and then fasten the bottle cap 11 to the powder bottle 14 to hold the dip tube 13 in the powder bottle 14. Thereafter, the spraying mechanism 2 is assembled. During the assembly process of the spraying mechanism 2, connect the nozzle tube 21 to the connection tube 22 by forcing the third endless rib 221 of the connection tube 22 into engagement with the third inside annular groove 2121 of the nozzle tube 21, and then insert the valve tube 24 into the connection tube 22, and then fasten the inflation bulb 23 to one end of the valve tube 24 remote from the nozzle tube 21, and then connect the spraying mechanism 2 to the nozzle head 12. To facilitate insertion of one end of the nozzle tube 21 remote from the inflation bulb 23 into the mounting hole 121 of the nozzle head 12, the guide block 211 of the nozzle tube 21 must be aimed at the guide notch 122. When the guide block 211 of the nozzle tube 21 is inserted into the guide notch 122, the second endless rib 214 of the nozzle tube 21 will be forced into engagement with the second inside annular groove 1211. Therefore, during installation of the nozzle tube 21 in the nozzle head 12, the nozzle tube 21 must be kept at a specific angle so that the bottom hole 213 of the nozzle tube 21 can be kept in communication with the through hole 112 of the bottle cap 11 after insertion of the nozzle tube 21 into the mounting hole 121 of the nozzle head 12.

Referring to FIGS. 1, 6 and 7 again, when using the powder sprayer, compress the inflation bulb 23 to force the internal air out of the inflation bulb 23 through the valve tube 24 into the air passage 212 of the nozzle tube 21. At this time, the ball 244 is forced away from the constricted portion 243 for letting the compressed air pass through the valve tube 24 and the connection tube 22 toward the nozzle tube 21. When the compressed air is being forced out of the other end of the air passage 212, a suction force is produced in between the air passage 212 and the transverse suction hole 213 subject to the venturi action, causing the contained powder to be sucked from the powder bottle 14 through the dip tube 13 into the air passage 212 and then carried by the compressed air out of the nozzle tube 21 in a mist for application. When the user releases the hand from the inflation bulb 23, the ball 244 is sucked backwards to stop against the constricted portion 243, prohibiting the powder from getting into the inflation bulb 23. At this time, the inflation bulb 23 returns to its former shape for a next operation.

The techniques of the present invention that eliminate the drawbacks of the prior art design are characterized in that:

1. The nozzle tube 21 is transversely inserted through the nozzle head 12 to keep its transverse suction hole 213 in communication with the through hole 112 of the bottle cap 11 so that a suction force is produced in between the air passage 212 and transverse suction hole 213 of the nozzle tube 21 subject to the venturi action, causing the contained powder to be sucked from the powder bottle 14 through the dip tube 13 into the air passage 212 and then carried by the compressed air out of the nozzle tube 21 in a mist for application. Thus, the invention has a simple structure, facilitating the design of the component parts.

2. Subject to the matching arrangement between the guide block 211 of the nozzle tube 21 and the guide notch 122 of the nozzle head 12, the nozzle tube 21 must be kept at a specific angle during installation so that the bottom hole 213 of the nozzle tube 21 can be kept in communication with the through hole 112 of the bottle cap 11 after insertion of the nozzle tube 21 into the mounting hole 121 of the nozzle head 12. This matching design improves the product yield rate.

3. The use of the valve tube 24 prohibits the applied powder from flowing reversely out of the air passage 212 into the inflation bulb 23 during inflation of the inflation bulb 23. Therefore, the invention effectively prevents reverse flow of the applied powder.

What the invention claimed is:

1. A powder sprayer, comprising a sprayer body holding a powder in a powder bottle thereof and a dip tube in said powder bottle, and a spraying mechanism installed in said sprayer body and operable through an inflation bulb thereof to force said powder out of said sprayer body in a mist, wherein:

said sprayer body comprises a bottle cap fastened to said powder bottle and a nozzle head mounted on a top side of said bottle cap, said bottle cap having a through hole vertically cut through top and bottom sides thereof for guiding in said powder from said powder bottle through said dip tube, said nozzle head having a transverse mounting hole transversely cut through the periphery thereof in communication with the through hole of said bottle cap and a guide notch located on the periphery at one end of said transverse mounting hole;

said spraying mechanism comprises a nozzle tube positioned in said transverse mounting hole, said nozzle tube having a guide block protruding from the periphery thereof and fitting the guide notch of said nozzle head, an air passage axially cut through two distal ends thereof and connected to said inflation bulb and a transverse suction hole located on the periphery thereof and disposed in communication between said air passage and the through hole of said bottle cap for sucking said powder from said powder bottle through said dip tube into said air passage when said inflation bulb is compressed by a user to force air out of said inflation bulb through said air passage;

wherein said bottle cap has a top neck upwardly protruded from a top side thereof around said through hole and a first endless rib protruded from and extending around the periphery thereof; said nozzle head having a bottom hole coupled to said top neck of said bottle cap and a first inside annular groove disposed in said bottom hole and forced into engagement with said first endless rib.

2. The powder sprayer as claimed in claim 1, wherein said dip tube has a top end connected to a bottom side of said bottle neck of bottle cap and a bottom end suspending in said powder bottle and inserted into said powder in said powder bottle.

3. A powder sprayer, comprising a sprayer body holding a powder in a powder bottle thereof and a dip tube in said powder bottle, and a spraying mechanism installed in said sprayer body and operable through an inflation bulb thereof to force said powder out of said sprayer body in a mist, wherein:

said sprayer body comprises a bottle cap fastened to said powder bottle and a nozzle head mounted on a top side of said bottle cap, said bottle cap having a through hole vertically cut through top and bottom sides thereof for guiding in said powder from said powder bottle through said dip tube, said nozzle head having a transverse mounting hole transversely cut through the periphery thereof in communication with the through hole of said bottle cap and a guide notch located on the periphery at one end of said transverse mounting hole;

said spraying mechanism comprises a nozzle tube positioned in said transverse mounting hole, said nozzle tube having a guide block protruding from the periphery thereof and fitting the guide notch of said nozzle head, an air passage axially cut through two distal ends thereof and connected to said inflation bulb and a transverse suction hole located on the periphery thereof and disposed in communication between said air passage and the through hole of said bottle cap for sucking said powder from said powder bottle through said dip tube into said air passage when said inflation bulb is compressed by a user to force air out of said inflation bulb through said air passage;

wherein said nozzle head has an inside annular groove disposed in one end of said transverse mounting hole; said nozzle tube has an endless rib protruded from and extending around the periphery thereof and forced into engagement with said inside annular groove.

4. A powder sprayer, comprising a sprayer body holding a powder in a powder bottle thereof and a dip tube in said powder bottle, and a spraying mechanism installed in said sprayer body and operable through an inflation bulb thereof to force said powder out of said sprayer body in a mist, wherein:

said sprayer body comprises a bottle cap fastened to said powder bottle and a nozzle head mounted on a top side of said bottle cap, said bottle cap having a through hole vertically cut through top and bottom sides thereof for guiding in said powder from said powder bottle through said dip tube, said nozzle head having a transverse mounting hole transversely cut through the periphery thereof in communication with the through hole of said bottle cap and a guide notch located on the periphery at one end of said transverse mounting hole;

said spraying mechanism comprises a nozzle tube positioned in said transverse mounting hole, said nozzle tube having a guide block protruding from the periphery thereof and fitting the guide notch of said nozzle head, an air passage axially cut through two distal ends thereof and connected to said inflation bulb and a transverse suction hole located on the periphery thereof and disposed in communication between said air passage and the through hole of said bottle cap for sucking said powder from said powder bottle through said dip tube into said air passage when said inflation bulb is compressed by a user to force air out of said inflation bulb through said air passage;

wherein said spraying mechanism further comprises a connection tube that connects said inflation bulb to said nozzle tube, said connection tube having an endless rib protruded from and extending around the periphery thereof; said nozzle tube has an inside annular groove disposed in one end of said air passage and forced into engagement with said third endless rib.

5. The powder sprayer as claimed in claim 4, wherein said spraying mechanism further comprises a valve tube connected between said connection tube and said inflation bulb, said valve tube having an axial air hole extending through the two distal ends thereof and disposed in air communication between said inflation bulb and said connection tube, a stop flange protruded from an inside wall thereof near one end of said axial air hole and a constricted portion disposed at an opposite end of said axial air hole, and a ball moving in axial air hole of said valve tube between said top flange and said constricted portion for closing/opening said axial air hole subject to the operation status of said inflation bulb.

* * * * *